(12) United States Patent
Alexander

(10) Patent No.: US 7,885,893 B2
(45) Date of Patent: Feb. 8, 2011

(54) METHOD AND SYSTEM FOR THE AUTHORIZATION OF AND PAYMENT FOR ELECTRIC CHARGING OF VEHICLES

(76) Inventor: Daniel Alexander, 38 Vermont St., West Roxbury, MA (US) 02132

( * ) Notice: Subject to any disclaimer, the term of this patent is extended or adjusted under 35 U.S.C. 154(b) by 106 days.

(21) Appl. No.: 12/045,131

(22) Filed: Mar. 10, 2008

(65) Prior Publication Data
US 2008/0228613 A1 Sep. 18, 2008

Related U.S. Application Data

(60) Provisional application No. 60/918,384, filed on Mar. 16, 2007.

(51) Int. Cl.
*G06Q 40/00* (2006.01)
(52) U.S. Cl. ...................................................... 705/40
(58) Field of Classification Search ................. 700/286; 455/522; 705/40, 35, 45
See application file for complete search history.

(56) References Cited

U.S. PATENT DOCUMENTS

| | | | | |
|---|---|---|---|---|
| 4,252,217 | A * | 2/1981 | Benjamin | 414/592 |
| 4,532,418 | A | 7/1985 | Meese et al. | |
| 5,760,742 | A * | 6/1998 | Branch et al. | 342/457 |
| 6,673,479 | B2 | 1/2004 | McArthur et al. | |
| 7,564,375 | B2 * | 7/2009 | Brinton et al. | 340/988 |
| 2001/0037174 | A1 * | 11/2001 | Dickerson | 701/200 |
| 2004/0090950 | A1 * | 5/2004 | Lauber et al. | 370/352 |
| 2004/0205032 | A1 | 10/2004 | Routtenberg et al. | |
| 2006/0206246 | A1 | 9/2006 | Walker | |
| 2006/0287783 | A1 | 12/2006 | Walker | |
| 2007/0093947 | A1 * | 4/2007 | Gould et al. | 701/29 |
| 2007/0124198 | A1 * | 5/2007 | Robinson et al. | 705/13 |
| 2007/0126395 | A1 * | 6/2007 | Suchar | 320/109 |
| 2007/0299565 | A1 * | 12/2007 | Oesterling | 701/1 |
| 2008/0039995 | A1 * | 2/2008 | Reeser | 701/30 |
| 2008/0172303 | A1 * | 7/2008 | Skaaksrud et al. | 705/26 |
| 2009/0005932 | A1 * | 1/2009 | Lee et al. | 701/41 |

OTHER PUBLICATIONS

"Ryder Rethinks Business Systems." Information Week, Sep. 26, 1994, p. 48.*
International Search Report and Written Opinion for PCT/US08/56381.
Kempton et al. "Vehicle-to-grid power implementation: From stabilizing the grid to support large-scale renewable energy". In: Journal of Power Sources [online], vol. 144, No. 1, p. 280-294. Published Dec. 8, 2004.

* cited by examiner

*Primary Examiner*—James A Kramer
*Assistant Examiner*—Martin A Gottschalk
(74) *Attorney, Agent, or Firm*—Modern Times Legal

(57) ABSTRACT

Methods and systems provide power to a mobile recipient and allow the recipient to pay for the power obtained by having it charged to an account other than the account for the location at which the power is provided.

5 Claims, 1 Drawing Sheet

METHOD AND SYSTEM FOR THE AUTHORIZATION OF AND PAYMENT FOR ELECTRIC CHARGING OF VEHICLES

PRIORITY CLAIM

This application claims priority to the following provisional patent application, the entirety of which is expressly incorporated herein by reference: U.S. Ser. No. 60/918,384 filed on Mar. 16, 2007, entitled "A Method and System for the Authorization of and Payment for Electric Charging of Vehicles."

BACKGROUND

1. Field of the Invention

This invention relates to methods and systems for authorizing the providing of power to electric vehicles or other mobile devices, and collecting for the same.

2. Background Information

Electric cars, which by their nature necessarily travel between a variety of locations, may need to be recharged when away from their home.

Given the "roaming" nature of electric vehicles, and the resulting need for them to be charged while away from home, there is a need for a method and system for effectively and efficiently permitting someone—such as the passenger, owner or operator of the car (the payor)—to pay for the power provided. But because the payor may be traveling from home in the vehicle, he or she may not have an account with the local power provider, for example, at an office where it may be convenient to recharge the vehicle, or at a location on a trip out of town. (Although this applies to electric or hybrid cars, it also applies to any case where someone at a given location away from home wants to obtain power for a mobile device of any sort, but lacks an account with the power provider at that location.)

For example, when a car is not at home, the operator needs to use the local source of electricity to recharge, and it would be convenient if the power purchased could be billed to the operator's account with his home electric provider or other third party perhaps one specially set up for this purpose) rather than the electric utility at the location of the recharging.

SUMMARY OF THE INVENTION

Embodiments of the systems and methods herein described can even work where there is no prior reciprocal relationship between the provider of power at the location of the recharge and the maintainer of the account to be charged.

In embodiments of the systems and methods described herein, power can be charged for on a flat rate or on a metered (as-used) basis. The as-used power may be measured by a metering unit in the vehicle to be charged, by a metering unit at the power source, or by a metering unit in a household or business at the recharging location. In both the flat rate and as-used case, the rate charged could be time-of-day sensitive; and this time-of-day information could be recorded and subsequently downloaded by a similar array of options: a metering unit in the vehicle, a metering unit at the power source, or a metering unit in the household or business at the recharging location. (Throughout this application, the term "vehicle" will be used to refer to the device being recharged, but it will be understood that the systems and methods disclosed herein are applicable to other mobile devices as well.)

Power could be electric power, pneumatic power, or other forms of stored or on-demand power. The power could be provided in a context where, absent the methods and systems disclosed herein, the power provided would be paid for through an account for the provision of power at the charging location (as an account at a local power utility) or, alternatively, in a context where the cost of the power is covered by the location providing power. If, for example, a visitor recharges his car at his friend's house, under embodiments of the disclosed methods and systems the resulting charges would be carved out from the host's electric bill from his local power utility (or could appear as an offsetting credit on that bill). In any case, the visitor would end up paying for the power, not the host.

The methods and systems envision that information concerning the power provided would be communicated to the entity maintaining the account to be billed. The information could include but not be limited to any or all of the account number(s) or other identifier(s) of the account to be charged, the amount of power provided, the time of day of delivery (such as start and stop time), the location of delivery and the provider of power. Note that collecting and communicating start and stop time information would help identify the transaction even if time of day pricing were not implemented.

A feature of embodiments of the methods and systems disclosed herein is that the person who wishes to pay for having a car or other device recharged (e.g., the operator of the car) need not have an existing business relationship with the provider of power (e.g. the providing electric company at the recharging location). Embodiments of the methods and systems provide that he has a way of identifying himself and thereby enabling the provider to be reimbursed (indirectly) while he is charged. In fact, it is a further feature of embodiments of the methods and systems disclosed herein that the provider of the power need not have a prior business arrangement (a reciprocal service relationship, for example) with the maintainer of the account which will ultimately bill the user for the power consumed in the recharge. In an embodiment of the systems and methods disclosed herein, when a vehicle presents itself for recharging, the power provider at that site, electronically or by other means, can query the account maintainer and determine if that entity is willing to reimburse the provider for power provided. That query optionally can include a PIN, password or other identifier, along with an identifier that maps to the account to be charged. A clearinghouse can be utilized in connection with this process, but even in the absence of a clearinghouse a query and response between the power provider and the account maintainer could facilitate the provision of power.

Another feature of an embodiment of the systems and methods disclosed herein is that much of the communication does not have to be in real time. Utilities, for example, generally bill on a monthly cycle, and in fact if a user's charge for recharging his vehicle did not show up on a bill from the account maintainer until the next month that would generally be acceptable. It is optional in embodiments of the systems and methods that the owner/operator of the device providing the power (for example a hotel or a private residence) would be a payor of last resort for the power.

It should be noted that the systems and methods disclosed herein are distinct from conventional credit card transactions in that in certain embodiments no prior arrangement between the power provider (merchant) and any other entity is required. This would be true, for one example, where the account for the location where the power is provided would be a payor of last resort, or where the provider of the power is willing to assume the risk that the holder of the account to be charged ultimately will not pay for the power.

A particular advantage of embodiments of the disclosed methods and systems is that other than the vehicles being charged it requires no other long-distance communication links between the locations where the power is provided and the accounting system because the vehicles being recharged themselves can constitute the long legs of both the downstream and upstream communications links, albeit not in real time. In certain embodiments, when a vehicle equipped to carry out the disclosed methods passes an information exchange point the fixed location system at the information exchange point can wirelessly communicate with the system on board the vehicle. (An information exchange point may be located at a highway on-ramp where, for example, a toll-reading system is deployed to read a transponder in a passing vehicle, or at a fast-food drive through for example. Other information exchange points may be utilized, and the two examples provided are not the sole options. For example, if cell phone transmission is to be used, the IEP may be a cell phone tower and associated network and computing equipment. Alternatively, WiMax may be used.) The information exchange point will receive the vehicle's identification code, validate that an account at an associated account maintainer is authorized for transactions and is in good standing, and update the system on the vehicle with current power-authorization codes to be used by the vehicle at power delivery locations.

At the same time, in some embodiments the system may use the vehicle to transfer data to the power delivery locations; upcoming codes for service or software updates would be two examples.

Also at the same time in some embodiments the information exchange point could query the system on the vehicle for data the vehicle may have collected from various power delivery locations it has visited since it last uploaded to an information exchange point. That information would be transmitted upstream from the information exchange point to the operator of the overall system. The advantage of this is that while the system operator would have to communicate with the fixed locations (perhaps 500-1,000 to adequately cover the United States), the number of power provision locations might easily be 500,000-1,000,000, and the power provision locations would be covered by the network using the vehicles as a link. This would provide coverage even in areas without cellular or telephone coverage; when a vehicle equipped with the systems disclosed herein visited a location where power was provided to it, data from that location concerning power transactions at that location would be uploaded to the vehicle so that the vehicle could in turn upload the information when it reached an information exchange point, and the information exchange point in turn could upload the information to the system operator so that appropriate charges could be sent to the account maintainers, and payments made to the power providers.

In some embodiments of the system, all participating vehicles would accept downloads of power authorization codes for provision of service to them, fewer than all would be required to collect the information from the power provider locations and send it upstream. Similarly, the system would function adequately if fewer than all were used to distribute updates to the power provision locations. In other embodiments of the system, fewer than all vehicles would accept downloads of power authorization codes, with other vehicles utilizing other means of identification and validation, such as an account number and pin, for one example, with the information for validating those vehicles having been delivered to the power provider locations by any of a number of means, such as a preceding communicating vehicle.

The disclosed methods and systems thus enable power to be provided from a variety of locations, charged to an account associated with the vehicle owner or user rather than to an account associated with the location where the power is provided. This could be carried out even if the power initially is charged to an account associated with the location, by identifying that account and crediting it for the charge at the same time that the account of the vehicle owner or user is charged. This would enable a vehicle user who visits a friend's home to hook up to the friend's electric service to charge his car, but ensure that the vehicle user pays for the power provided to the vehicle.

Embodiments of the disclosed methods and systems also enable the recording of time day and amount of power delivery to a vehicle, even if the account to be charged is the same as the account paying for the power at that location. For example, if the utility provides a discount for power taken at a residence for the charging of a vehicle between certain hours, the present disclosure would permit recording the power taken for that purpose, the hours and date taken, and then when in contact with an information exchange point that information could be uploaded to eventually reach the maintainer of the account at that location for the application of the relevant discount. Alternatively, the information could be downloaded from the vehicle taking the power at another (so-equipped) power provision location for subsequent transmission to the maintainer of the account at which the power was provided by any of a number of means, such as a subsequent communicating vehicle.

Four kinds of payment arrangements are possible when a vehicle is charged at an away-from-home location. These are 1) "on-us", 2) bilateral, 3) clearing-house and 4) prepaid.

1) In an on-us arrangement, the account of the vehicle owner or user to be charged is kept by the provider of power at the location where the provision is taking place, thus, the credit to the account associated with the location (if required) and the debit to the account to be charged can all take place of the books of the same (on-us) power provider.

2) In a bilateral situation, the power provider provides billing information to and receives reimbursement from an account maintainer. The account maintainer generally is envisioned to be another power provider, typically the one associated with the home location of the vehicle owner or user. Alternatively, however the account provider could be another kind of entity, for example one set up explicitly for this purpose. A very rough analogy here might be a bilateral cellular phone roaming arrangement between two carriers, but unlike in the cellular telephone situation no prior arrangement between the two entities is required in certain embodiments. Bilateral arrangements could include bilateral net settlement arrangements.

3) A clearinghouse may serve to reduce the connections required among the parties, and can also reduce the number of transactions required. In some cases, the power provider will see itself as having a transaction with the clearinghouse rather than directly with the account maintainer, and there will be a corresponding transaction between the clearinghouse and the account maintainer. The clearinghouse is a central facility or exchange with which the parties correspond and, in some cases, engage in transactions. Clearinghouse arrangements are much the same as bilateral arrangements except that a clearinghouse can collect and distribute charge information so that the provider need not deal with the account maintainer. That way each power provider does not have to have a direct link to each account maintainer whose customers the provider is willing to accept. The same or a different clearinghouse can provide identity validation and/or charge approval information. Clearinghouse arrangements can also facilitate net settlement between the providers and maintainers: in its simplest (bilateral) form the party between two parties that owes the larger amount will pay the net of gross obligations between them (as noted above, this net settlement could also occur directly between the two parties without the clearinghouse). In a more sophisticated form, settlement is against the clearinghouse, and the relative obligations of several parties are netted out, reducing the number of payments required in the aggregate, perhaps to a single payment for each power provider or account maintainer to or from the clearinghouse. A further advantage of settlement against the clearinghouse is that the parties need not have mutual arrangements with each other. This net settlement is particularly useful in that it is envisioned that in some cases some account maintainers will also be power providers and so a clearinghouse would substantially reduce the settlement payments and receipts that would have to occur.

4) Prepaid arrangements are roughly analogous to prepaid long-distance or cellular services; the power is provided against a prepaid balance that is drawn down by the amount to be charged, and if the account is held by an entity other than the provider, a direct or indirect payment will take place.

In sum, the maintainer of the account to be charged could the provider of the power, a clearinghouse, the provider of power at the user's customary address, or another entity.

BRIEF DESCRIPTION OF THE DRAWINGS

The description below refers to the accompanying drawings, of which.

DETAILED DESCRIPTION OF ILLUSTRATIVE EMBODIMENTS

Figure 1:
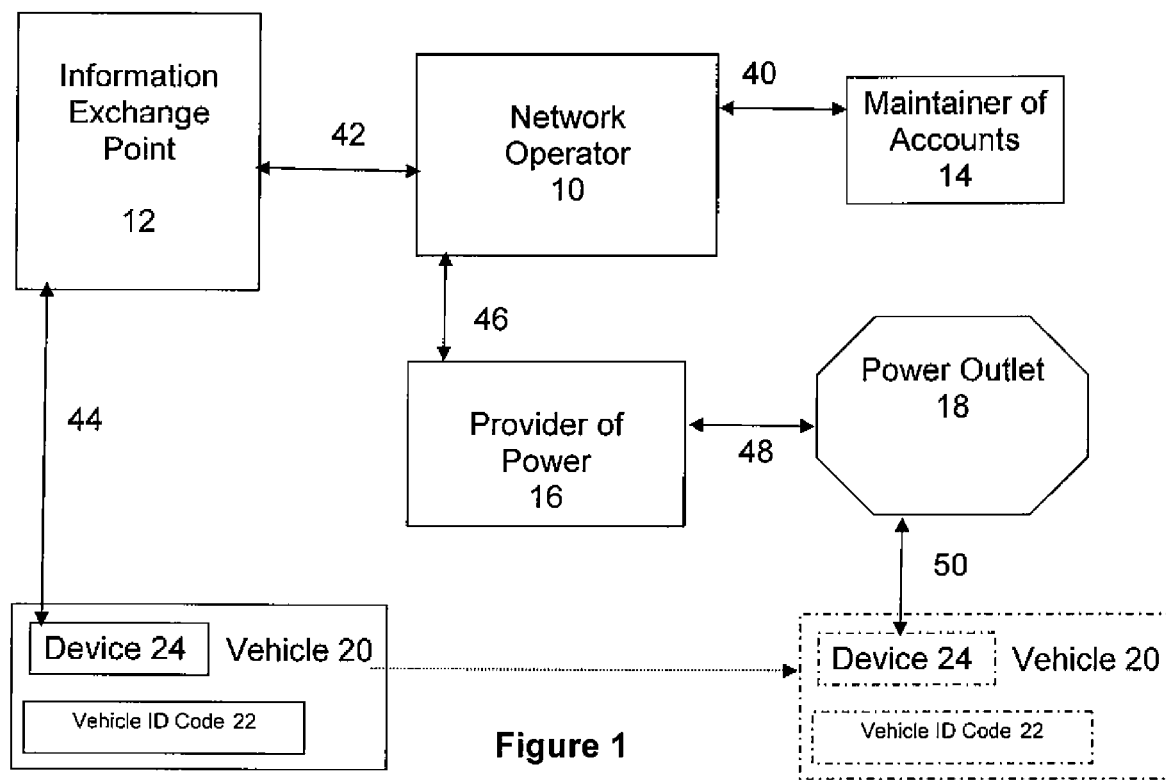
FIG. 1 is a flow chart of an embodiment of the systems and methods disclosed herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, specified, interchanged, and/or rearranged without departing from the disclosed devices or methods. Additionally, the shapes and sizes of components are also exemplary, and unless otherwise specified, can be altered without affecting the disclosed devices or methods.

As shown in FIG. 1, an exemplary system and method comprises a vehicle 20 (such as an electric or hybrid car) that has a vehicle ID code 22 associated with it and is equipped with a communications device 24 which may be a transponder or other wired or wireless connection. The vehicle may communicate 44 by means of the device 24 with a nearby information exchange point ("IEP") 12. That communication may provide the IEP with the ID code 22 of the vehicle 20. The IEP 12 will have previously received 42 from the Network Operator 10 a list of vehicle ID codes associated with accounts in good standing at maintainers of accounts 14, as well as current power authorization codes and possibly also a list of delinquent vehicle ID codes. (Alternatively, the IEP 12 could access the account data related to the vehicle 20 in real-time from the maintainer of accounts 14.) In turn, the Network Operator 10 will have previously received 40 lists of accounts in good standing and possibly of delinquent accounts from the various Maintainers of Accounts 14. (Alternatively, of course, the vehicle ID code could itself be an account number of an account in good standing at a maintainer of accounts.) On the basis of this previously-provided information and the information provided by the vehicle, the IEP 12 will determine if the vehicle 20 is eligible for power, and if so will provide vehicle 20 through communications device 24 with a current set of power authorization codes to use at power outlets 18 to obtain power. In addition the IEP 12 could provide some or all of the vehicles 20 with codes, software updates, valid or invalid vehicle ID codes or other information for onward transmission by the communications device 24 associated with vehicle 20 to other power outlets 18.

In alternative embodiments, the communications device 24 rather than being built into the vehicle 20 may be portable, and a user may transfer the device 24 from vehicle 20 to another vehicle, for example another vehicle owned by the same family. In these embodiments, the device 24 would be associated with a user, and authorization would run to the user, rather than a particular vehicle 20.

In alternative embodiments of the invention, not illustrated in FIG. 1, the function of the IEPs 12 would be served in whole or in part by some or all power outlets 18. In one embodiment, some subset of the power outlets 18 would be networked to the Network Operator 10 and provide some or all of the vehicles 20 with power authorization codes for their use, and some or all of the vehicles 20 with codes, software updates, valid or invalid vehicle ID codes or other information for onward transmission by the communications device 24 associated with vehicle 20 to other power outlets 18 (and possibly IEPs), in particular power outlets 18 and IEPs 12 not in communication by conventional means with the Network Operator 10. Similarly, the power outlets 18 could perform the function of uploading the data collected, discussed below. In another embodiment, all power outlets 18 could be networked to the Network Operator 10 and upon receipt of a communication from the communications device 24 associated with a vehicle 20 could query the Network Operator 10 or the Maintainer of Accounts 14 in real time as to whether that vehicle 20 was authorized to receive power.

The Network Operator 10 may have also provided 42 the IEP 12 with information for the power outlets 18 which the IEP 12 will provide 44 to some or all vehicles 20.

The device 24 in the vehicle 20 while at a power provider 18 may have previously collected 50 transaction data which it will upload 44 to the IEP 12 for onward transmission 42 to the Network Operator 10. The Network Operator 10 will in turn forward 40 the transaction information to the Maintainers of Accounts 14. Similarly, the Network Operator 10 will send 46 each Provider of Power 16 transaction information for the accounts served with power by power outlets 18. In the case where the power is to be paid for by a third party (for example the operator of the vehicle 20) the power provider 16 will credit the account (if any) that would have otherwise be charged for the power. The Network Operator 10 may receive 46 from the power providers 16 their current pricing information, or, alternatively, pricing may be set by the Maintainers of Accounts 14. In addition, the Network Operator 10 will provide credit advices to the power providers 16 arising from transactions processed.

A vehicle 20 which includes a device 24 may present itself to the power outlet 18 to obtain power. The device 24 may identify the vehicle 24 to the power outlet 18 by means of the vehicle ID code 22 and may provide a power authorization code. Alternatively, many other modes of identification are possible, such as but not limited to card swipe, keypad and license plate scan. Similarly, keypad pin entry for the authorization code would be a possibility. The power outlet 18 will have intelligence to analyze the power authorization code presented and confirm that it is valid for the provision of power and if so the power will be provided. Alternatively, the power outlet 18 could be networked to the Network Operator 10 and upon receipt of a communication from the communications device 24 associated with the vehicle 20 could query the Network Operator 10 or the Maintainer of Accounts 14 in real time as to whether that vehicle 20 was authorized to receive power. Also, optionally, the device 24 may provide updates and future codes and other information to the power outlet 18. Additionally, in an embodiment the power outlet 18 may provide the device 24 with transaction data from the current and/or prior transactions for onward transmission, ultimately to the Network Operator 10 via one of the many IEPs 12. Alternatively, the role of the IEP could be supplanted by wireless transmission directly to the Network Operator, via cellular or WiFi for example.

It will be understood that the network operator 10 can carry out the methods described herein by means of any number or variety of computing devices, networked or stand-alone, equipped with the usual computer components, including a processor or processors, input and output devices for direct or indirect communications for example with IEPs, power providers and account maintainers, storage media for storing software to carry out instructions to perform the method steps described herein, and the like. Communications may be over the Internet, or by other links, as is well known to persons of skill in the art.

The invention claimed is:

1. A computer-implemented method for facilitating payment for providing power to vehicles, comprising:
    a. obtaining, at a central computer, validated vehicle identification codes from an account maintainer, wherein each validated vehicle identification code is associated with a unique vehicle capable of being charged with electricity, wherein said electricity powers the vehicle, and with a user account that the account maintainer has pre-authorized to be in good standing for conducting transactions, wherein the account maintainer pays for provision of power to the vehicles, and wherein at least some of the vehicles are equipped with a power-authorization-code-transmitting communication device, including a wired or wireless connection, wherein said power-authorization-code-transmitting communication device is operable to transmit validated vehicle identification codes, to receive at least one valid power-authorization code from a processor at an information exchange point, and to transmit said at least one valid power-authorization code to a processor at a charging station that is permanently or temporarily inaccessible to alternative electronic or electromagnetic communications channels, wherein a contractual arrangement has been made for the charging station to provide power upon transmission by a vehicle of the valid power-authorization code to the processor at the charging station, and wherein at least some of the vehicles are equipped with a transaction-collecting communication device including a wired or wireless connection, wherein said transaction-collecting communication device collects executed-power-provision-transaction billing data from the charging station;
    b. transmitting electronically or electromagnetically from the central computer, at least one of the validated vehicle identification codes and at least one valid power-authorization code to at least one information exchange point located at a location that is well-trafficked by said power-authorization-code-transmitting communication device equipped vehicles;
    c. the processor of the information exchange point transmitting electronically or electromagnetically at least one valid power-authorization code to the power-authorization-code-transmitting communication device on at least one of the vehicles immediately following the vehicle's power-authorization-code-transmitting communication device communicating to the processor of the information exchange point one of the validated vehicle identification codes, wherein the vehicle receiving the valid power-authorization code is enabled to obtain power when it subsequently presents the valid power-authorization code to a charging station;
    d. the vehicle power-authorization-code-transmitting communication device transmitting electronically or electromagnetically the at least one valid power-authorization code to the charging station, wherein the charging station is then enabled to provide power to vehicles that subsequently request power from the charging station by electronically or electromagnetically transmitting the valid power-authorization code;
    e. the charging station transmitting electronically or electromagnetically the executed-power-provision-transaction billing data to the transaction-collecting communication device of at least one of the vehicles equipped with a transaction collecting communication device; and then
    f. the transaction-collecting communication device transmitting the executed-power-provision-transaction billing data to the processor of at least one information exchange point; and then
    g. receiving electronically or electromagnetically at the central computer, executed-power-provision-transaction billing data from the processor of at least one information exchange point; and then
    h. transmitting electronically or electromagnetically the executed-power-provision-transaction billing data from the central computer to the account maintainer.

2. The method of claim 1, wherein at least some of the power-authorization-code-transmitting devices are integral with at least some of the transaction-collecting communication devices.

3. The method of claim 1, wherein the account maintainer is a third party other than a provider of electric power to the charging station.

4. The method of claim 1, wherein the vehicles are operated by vehicle operators who live in homes, and wherein the account maintainer is an electric provider that provides electric power to the homes of the vehicle operators but not to the charging station.

5. The method of claim 1, wherein communications to and from at least one of the vehicles are accomplished by wireless communication.

* * * * *